Dec. 25, 1962 K. A. LENNON 3,070,063
ROTATABLE FLEXIBLE DIAL OR THE LIKE
Filed Oct. 24, 1960 2 Sheets-Sheet 1
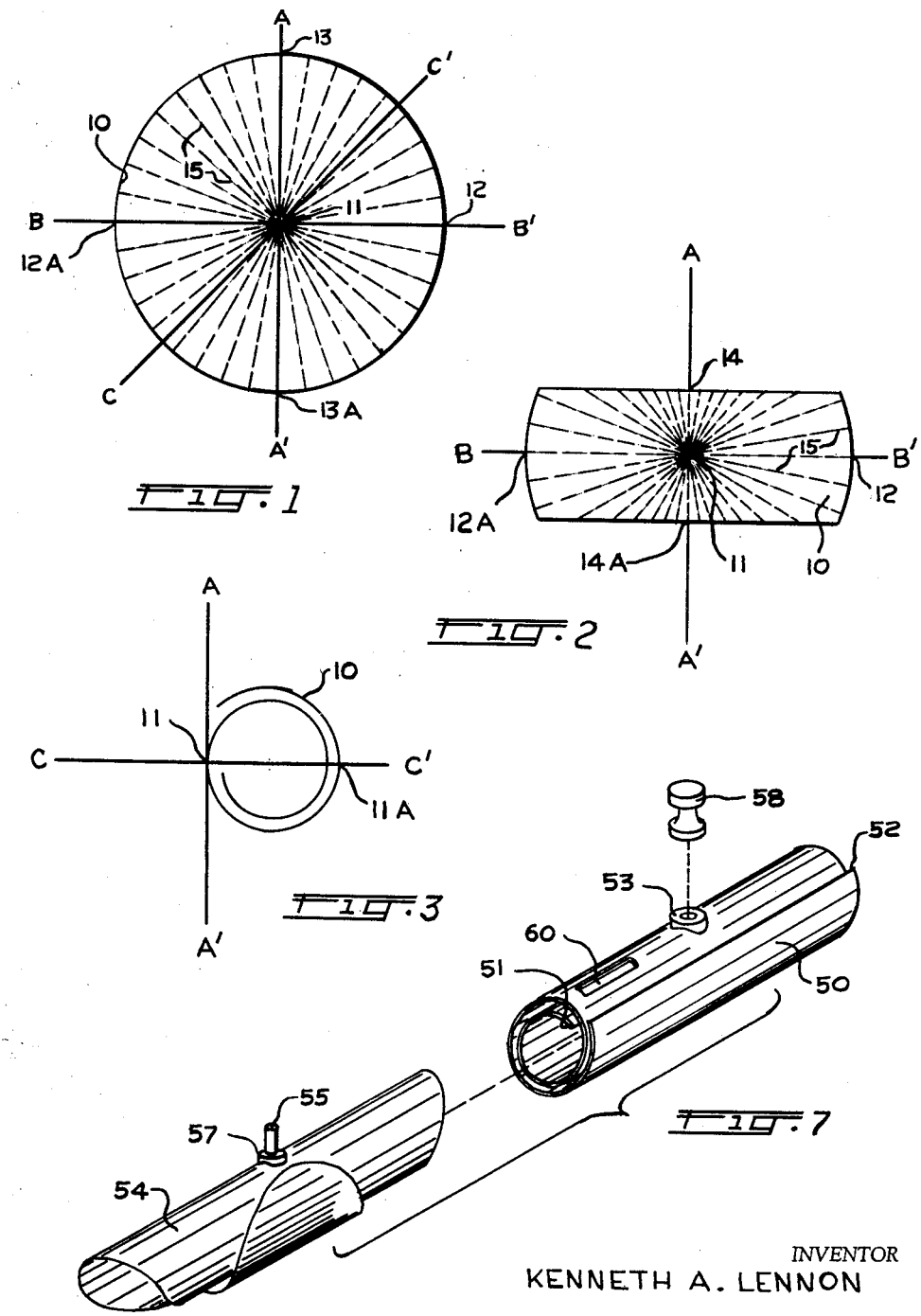
INVENTOR
KENNETH A. LENNON
BY W. E. Sherwood
ATTORNEY

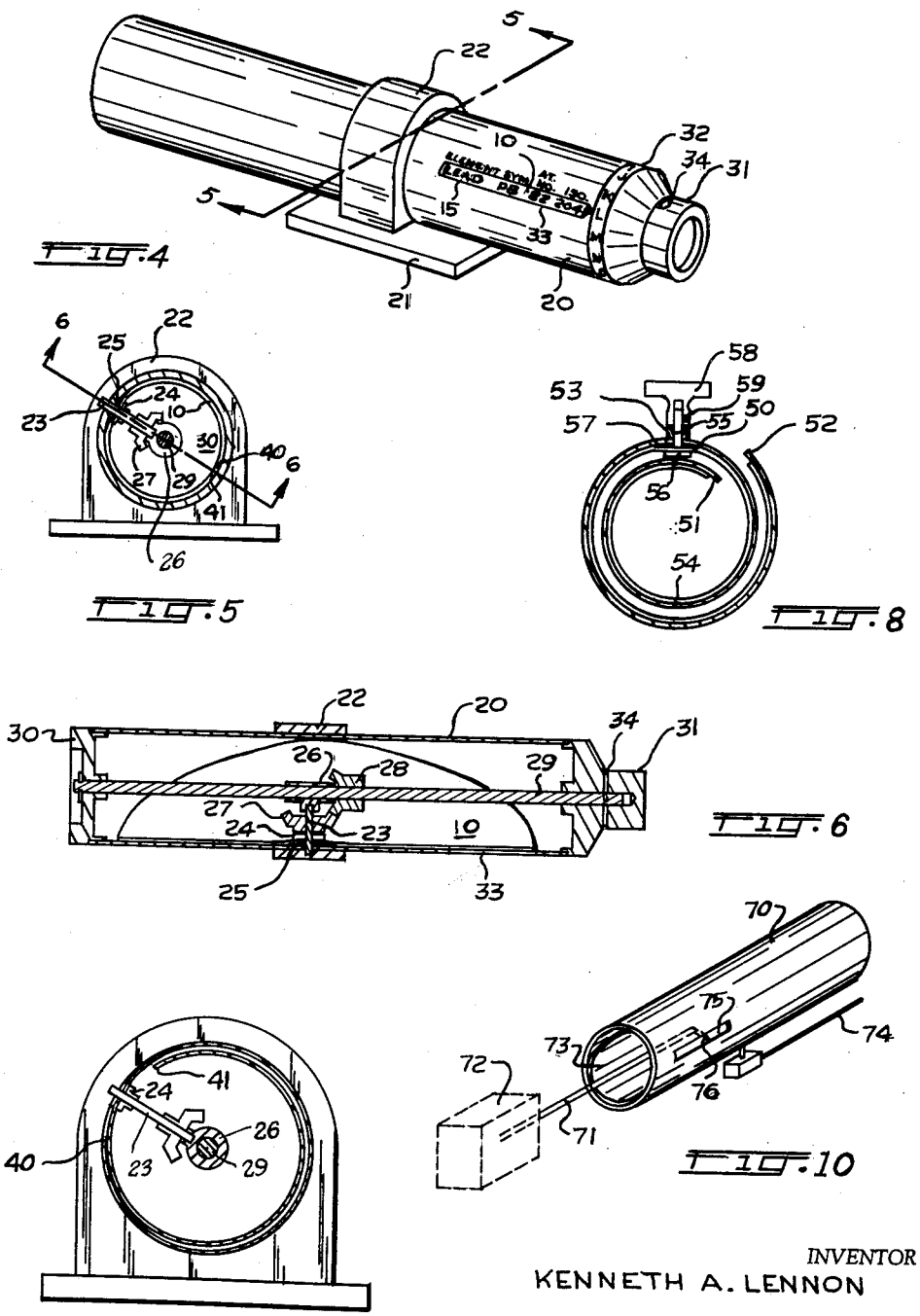

United States Patent Office 3,070,063
Patented Dec. 25, 1962

3,070,063
ROTATABLE FLEXIBLE DIAL OR THE LIKE
Kenneth A. Lennon, 201 Sutton Place, Lexington, Ky.
Filed Oct. 24, 1960, Ser. No. 64,542
10 Claims. (Cl. 116—133)

This invention relates to a rotatable dial or the like and more particularly to a circular type of dial or the like adapted to store a large amount of information and to be housed in a compact space.

Widespread usage is made of flat surfaced dials, charts and the like for the storage or recording of information by means of polar coordinates or similar relationships. However, when such a dial is employed for movement in a single plane, two dimensions in that plane must be large enough to accommodate the diameter of that dial and the dial accordingly occupies three-dimensional space only insofar as its thickness is concerned. In many situations wherein use of such a dial would be preferred, rather than using a drum type of dial, it is found to be impossible to use the same because of a limitation as to available space in one of the two dimensions although adequate space is available in the third dimension normally occupied only by the thickness of the dial. It is the purpose of the present invention to provide a rotatable flexible dial suitable for use in situations wherein the just described space limitations are present.

An object of the invention is to provide an improved rotatable flexible dial, chart, or the like of the circular type, and which may be compactly arranged in three-dimensional space.

Another object is to provide a housing for compactly mounting a rotatable dial, chart, or the like of the circular type in three-dimensional space.

A further object is to provide a means for actuating a rotatable flexible dial, chart, or the like mounted in curved form within a housing.

Other objects and advantages of the invention will become more apparent as the description proceeds and when considered in conjunction with the accompanying drawings in which:

FIG. 1 is a diagrammatic view indicating the space relationships of a conventional circular dial with respect to three coordinate planes.

FIG. 2 is a diagrammatic view indicating the space relationships of the dial of the present invention with respect to first and second planes of the three coordinate planes.

FIG. 3 is a diagrammatic view indicating the space relationships of the dial of the present invention with respect to first and third planes of the three coordinate planes.

FIG. 4 is a perspective view of one form of housing for a dial employing the invention.

FIG. 5 is a sectional view taken on line 5—5 of FIG. 4, and with parts of the gearing omitted.

FIG. 6 is a longitudinal section of the structure shown on FIG. 4 and taken along the plane shown by line 6—6 of FIG. 5.

FIG. 7 is a perspective view of a second form of housing for a dial employing the invention and with the parts shown separated from each other.

FIG. 8 is a transverse sectional view of the structure of FIG. 7 when assembled in an operative relation and with the section taken intermediate the actuating knob and the aperture of the spiral housing.

FIG. 9 is a view similar to FIG. 5 and drawn to a larger scale, but showing a larger dial than the dial shown in FIG. 5 and with parts of the gearing omitted.

FIG. 10 is a schematic view showing a rotatable dial employing the invention and mounted within a housing having an open end through which a recording pen shaft extends, and In accordance with the invention I provide a flexible generally circular dial, chart or the like which has an information-containing surface, and with that dial being arranged in a curved form within a housing which has an arcuate, smooth, dial-guiding surface in contact with the surface of the dial which is to be viewed. The length dimension of the housing in a second plane is at least as long as the diameter of the dial, but both the width and height dimensions of the housing in third and first coordinate planes respectively are substantially less than the diameter of the dial. Means are provided for mounting the dial near its center in supported relation to the housing and means also are provided for rotating the dial. In addition, means are available for viewing the information containing surface of the dial as it is rotated to a predetermined position of rotation about its center. Depending upon the space available for the structure, and the amount of read-out desired on the dial, the dial may rotate with its surface in contact only with the arcuate surface of the housing or with its surface in contact both with the housing and with a layer of the dial material itself.

Referring now to FIGURES 1 to 3 and considering the system of coordinate planes represented by the mutually perpendicular lines A—A'; B—B'; and C—C'; it will be seen that a conventional flat circular dial 10 rotatable about its axis 11 may be mounted in the plane A—A'—B—B' indicative of length and height. When so mounted, it will occupy but little space in the depth dimension, but will extend to points 12, 12A and 13, 13A in the length and height directions.

In many situations, however, such as in submarine control panels, power station control panels and the like, inadequate space is available in both of those directions although sufficient space may be available in the third direction of depth. Therefore, when the dial is made of a suitable material and is mounted and actuated in accordance with this invention, it is especially well suited for usage in the above described situation. Thus the dial upon being arranged in curved form with respect to its housing will, as seen in FIGS. 2 and 3 extend only to points 14 and 14A in height along the first dimension and to points 11 and 11A in depth along the third dimension, while extending as before to points 12 and 12A, along the second or length dimension. In each case, moreover, the same size of dial is employed and all of the information contained on its surface and represented by the markings 15 is available for its intended usage. The well-known advantages of a circular dial with a long read-out may thus be preserved as long as one dimension suitable for accommodating the diameter of the dial is available. Various forms of apparatus for employing the above-described relationships may be used in accordance with the invention and in FIGS. 4 to 6 a simple structure having a means for actuating the dial interiorly of the housing is shown. The dial 10 comprises a circular thin sheet of material characterized by its flexibility, lack of grain structure, and wear resistance property. Mylar represents such a material and is preferred. Depending upon its use, the dial may be transparent or opaque. The housing 20 may, as an illustration, comprise a tube of extruded aluminum polished on its inner surface. For example, when using a Mylar dial having a diameter of 6.0 inches and a thickness of 0.003 inch, an inner tube diameter of 2.0 inches gives good results and illustrates the large reduction of space in the height dimension afforded by the invention. Adjacent its central region the housing includes a mounting means such as a plate 21 having a band 22 encompassing the exterior periphery of the tube. A stub shaft 23 seating at one end in a recess within the band 22 extends through the dial at its axis 11 (FIG. 1) and is attached to the dial as by means of an inner collar 24 and an outer collar 25 joined to each other and to the stub shaft and clamping the dial therebetween. The outer collar preferably has an arcuate outer surface corresponding to the inside radius of tube 20. At its other end, the stub shaft is rotatably mounted in a shaft retainer 26, which has an aperture extending lengthwise and at right angles to the stub shaft, as best seen in FIG. 6.

Fixed to the stub shaft 23 intermediate its end is a bevel gear 27. Meshed with this bevel gear is a drive gear 28 of bevel shape and which is fixed to drive shaft 29. This shaft extends through the retainer 26 and at its distal end is rotatably mounted in an end cap 30 closing one end of the housing. At its proximal end the drive shaft is attached as by a pin 34 to a rotatable knob 31 closing the other end of the housing and displaying certain indicia 32 related to the information-containing markings 15 on the dial. An elongated aperture 33 is formed in the wall of the tube and through which the information contained on the dial may be viewed.

As seen in FIG. 5 the dial lies in curved form within the tube and with one surface being movable in contact with the inner surface of the tubular housing. As the knob 31 is rotated, the stub shaft 23 likewise is rotated and causes the dial to rotate about its central axis 11. However, due to the confining or guiding nature of the tube, each angular sector of the normally circular dial is forced into conformation with the generally tubular curved shape of the confined dial as it is rotated.

In FIG. 5 the dial is shown as having a smaller diameter which, when the dial is housed in the tube permits the dial surface to contact only the inner surface of the tube. Thus the diametrical edges 40 and 41 of the dial would then sweep outwardly along the axis of tube 20 to occupy relatively closely spaced points 12 and 12A (FIG. 1) in the length dimension during operation of the device. It has been found, however, that a much greater read-out of the dial can be obtained when its diameter is substantially increased, as shown by FIG. 9, and wherein the edge 40 of the dial extends into proximity to the collar 24 on one side and the edge 41 of the dial extends into proximity to that collar on the other side so that the dial may rotate in contact with itself and with the inner surface of the tube. In this modification, the edges 40 and 41 will sweep outwardly along the axis of the tube to occupy relatively greater spaced points 12 and 12A in the length dimension, but without requiring any greater distances in either the width or depth dimensions of the housing. By comparison with the 6 inch diameter dial in FIG. 5, this modification permits the dial diameter to be doubled.

It is not necessary that the housing be closed, or that the dial be actuated from within the housing, and as shown in FIGS. 7 and 8 the essential features of the invention may be employed in a simplified and inexpensive manner by using a spirally formed elongated housing 50 having a smooth inner surface and terminating at one longitudinal edge 51 within the spiral and at another longitudinal edge 52 outside the spiral. Centrally of the housing, with respect to its ends and with respect to its longitudinal edges, an external boss 53 is provided with an aperture extending therethrough. The dial 54 of circular form is provided with a shaft 55 affixed to the dial at its center as between two collars 56 and 57 and with that shaft extending through the apertured boss 53. A knob 58 having a set screw 59 engaging the shaft is used for rotating the dial from a position outside the housing. The dial when curved into generally tubular form as seen at the left of FIG. 7, may then be positioned for engagement with the knob, and as the knob is turned, the information on the dial may be viewed through an aperture 60 formed in the housing. In this arrangement, a dial of substantially larger diameter is employed than in the case of the dial shown in FIG. 5 and at the same time will be movable only in contact with the surface of the housing.

As a further illustration of the capabilities of the invention, the dial may take the form of a recording chart and as seen in FIG. 10 the housing 70 may have an opening at one end into which a conventional recording pen 71 projects. The movement of the pin is governed and actuated by any suitable conventional mechanism 72 responsive to the conditions of which a record is desired. In this arrangement the rotation of the chart 73 within the housing, is effected by a suitable timed drive shaft 74 attached to the chart. An aperture 75 in the wall of the housing provides for viewing of the trace 76 of the pen upon the chart.

The information-containing surface of a transparent dial conveniently comprises the surface of the dial which is out of contact with the arcuate surface of the housing. In an opaque dial, however, wherein the dial is to be viewed through an aperture in the housing, as shown, the information-containing surface will comprise the dial surface movable in contact with the surface of the housing.

Having thus described the invention and having shown various forms and modifications thereof in which the space saving features of the same may be utilized, it will be apparent to those skilled in the art that other forms and modifications may be employed. It will, therefore, be understood that I do not wish to be limited to the precise modifications herein shown and I contemplate by the appended claims to cover any modifications as fall within the true spirit and scope of my invention.

What is claimed is:

1. Means for storing information in compact form and including a flexible, generally circular dial or the like having an information-containing surface, a housing having an arcuate smooth dial-guiding surface, dial-mounting means attached to said dial adjacent the center thereof and supported by said housing, an aperture extending through the dial-guiding surface of said housing and permitting viewing through said aperture of the information-containing surface of said dial at a predetermined position of rotation thereof about its center, and means for rotating said dial, said dial while disposed in said housing being arranged in curved form with one of its surfaces being movable in contact with said dial-guiding surface of said housing.

2. Apparatus as defined in claim 1 wherein said means for rotating said dial includes a shaft extending through a side wall of said housing and adapted for actuation externally of said housing.

3. Apparatus as defined in claim 1 wherein said means for rotating said dial includes a shaft extending through an end of said housing and adapted for actuation externally of said housing.

4. Apparatus as defined in claim 1 wherein the length of said housing is not less than the diameter of said dial.

5. Apparatus as defined in claim 1 wherein the width of said housing is substantially less than the diameter of said dial.

6. Apparatus as defined in claim 1 wherein the height of said housing is substantially less than the diameter of said dial.

7. Means for storing information in compact form and including a flexible generally circular dial or the like, having an information-containing surface, a tubular housing of uniform diameter having a smooth internal dial-guiding surface, dial-mounting means attached to said dial adjacent the center thereof and supported by said housing, an aperture extending through the dial-guiding surface of said housing and permitting viewing through said aperture of the information-containing surface of said dial at a predetermined position of rotation thereof about its center and means for rotating said dial, said dial while disposed in said housing being arranged in curved form with one of its surfaces being movable in contact with said dial-guiding surface of said housing.

8. Apparatus as defined in claim 7 wherein the diameter of said dial is no greater than the inner periphery of said housing.

9. Apparatus as defined in claim 7 wherein the diameter of said dial is greater than the inner periphery of said housing.

10. Means for storing information in compact form and including a flexible generally circular dial or the like having an information-containing surface, an elongated spiral housing of uniform cross section lengthwise thereof and having a smooth inner dial-guiding surface, dial-mounting means attached to said dial adjacent the center thereof and supported by said housing, an aperture extending through the dial-guiding surface of said housing and permitting viewing through said aperture of the information-containing surface of said dial at a predetermined position of rotation thereof, and means for rotating said dial, said dial while disposed in said housing being arranged in curved form with one of its surfaces being movable in contact with said dial-guiding surface of said housing.

References Cited in the file of this patent
UNITED STATES PATENTS

| | | |
|---|---|---|
| 1,760,947 | Healey | June 3, 1930 |
| 2,600,822 | Yarnall et al. | June 17, 1952 |